US011175884B2

(12) United States Patent
Reilly

(10) Patent No.: US 11,175,884 B2
(45) Date of Patent: Nov. 16, 2021

(54) PRE-CACHING OF MEDIA

(71) Applicant: Sonos, Inc., Santa Barbara, CA (US)

(72) Inventor: Jonathon Reilly, Cambridge, MA (US)

(73) Assignee: Sonos, Inc., Santa Barbara, CA (US)

( * ) Notice: Subject to any disclaimer, the term of this patent is extended or adjusted under 35 U.S.C. 154(b) by 0 days.

(21) Appl. No.: 16/796,153

(22) Filed: Feb. 20, 2020

(65) Prior Publication Data

US 2020/0364024 A1 Nov. 19, 2020

Related U.S. Application Data

(63) Continuation of application No. 16/188,257, filed on Nov. 12, 2018, now Pat. No. 10,572,218, which is a
(Continued)

(51) Int. Cl.
*G06F 3/16* (2006.01)
*G06F 12/0862* (2016.01)
(Continued)

(52) U.S. Cl.
CPC ............. *G06F 3/165* (2013.01); *G05B 15/02* (2013.01); *G06F 12/0862* (2013.01);
(Continued)

(58) Field of Classification Search
CPC ..... G05B 15/02; G06F 3/165; G06F 12/0862; G06F 16/60; G06F 2212/602; H04N 21/43615; H04N 21/4392; H04N 21/44218
(Continued)

(56) References Cited

U.S. PATENT DOCUMENTS 5,440,644 A 8/1995 Farinelli et al.
5,761,320 A 6/1998 Farinelli et al.
(Continued)

FOREIGN PATENT DOCUMENTS

CN 102203701 A 9/2011
EP 1389853 A1 2/2004
(Continued)

OTHER PUBLICATIONS

AudioTron Quick Start Guide, Version 1.0, Mar. 2001, 24 pages.
(Continued)

*Primary Examiner* — Hemant S Patel
(74) *Attorney, Agent, or Firm* — Akerman LLP

(57) ABSTRACT

Example techniques involve pre-caching media content. An example implementation involves a first playback device detecting, via at least one proximity sensor, motion in proximity to the proximity sensor. In response, the first playback device sends, to a second playback device, one or more first messages indicating that the first playback device detected motion. Afterwards, the first playback device receives, via the network interface from the second playback device in response to the one or more first messages, one or more second messages that instruct the first playback device to pre-cache, from a network source, a portion of audio content indicated in a playback queue associated with a playback device group including the first playback device and the second playback device. The first playback device receives a command to play back the playback queue and plays back the audio content indicated in the playback queue jointly with the second playback device.

20 Claims, 10 Drawing Sheets

Related U.S. Application Data continuation of application No. 15/946,515, filed on Apr. 5, 2018, now Pat. No. 10,127,010, which is a continuation of application No. 14/850,778, filed on Sep. 10, 2015, now Pat. No. 9,940,092, which is a continuation of application No. 13/777,780, filed on Feb. 26, 2013, now Pat. No. 9,195,432.

(51) Int. Cl.

| | | |
|---|---|---|
| G06F 16/60 | (2019.01) | |
| H04N 21/436 | (2011.01) | |
| H04N 21/439 | (2011.01) | |
| G05B 15/02 | (2006.01) | |
| H04N 21/442 | (2011.01) | |

(52) U.S. Cl.
CPC ......... *G06F 16/60* (2019.01); *H04N 21/4392* (2013.01); *H04N 21/43615* (2013.01); *H04N 21/44218* (2013.01); *G06F 2212/602* (2013.01)

(58) Field of Classification Search
USPC ............................... 348/14.01–14.16; 700/94
See application file for complete search history.

(56) References Cited

U.S. PATENT DOCUMENTS

| | | | |
|---|---|---|---|
| 5,923,902 | A | 7/1999 | Inagaki |
| 6,032,202 | A | 2/2000 | Lea et al. |
| 6,256,554 | B1 | 7/2001 | DiLorenzo |
| 6,404,811 | B1 | 6/2002 | Cvetko et al. |
| 6,469,633 | B1 | 10/2002 | Wachter et al. |
| 6,522,886 | B1 | 2/2003 | Youngs et al. |
| 6,611,537 | B1 | 8/2003 | Edens et al. |
| 6,631,410 | B1 | 10/2003 | Kowalski et al. |
| 6,643,744 | B1 | 11/2003 | Cheng |
| 6,757,517 | B2 | 6/2004 | Chang |
| 6,763,040 | B1 | 7/2004 | Hite et al. |
| 6,778,869 | B2 | 8/2004 | Champion |
| 6,915,176 | B2 | 7/2005 | Novelli et al. |
| 7,130,608 | B2 | 10/2006 | Hollstrom et al. |
| 7,130,616 | B2 | 10/2006 | Janik |
| 7,143,939 | B2 | 12/2006 | Henzerling |
| 7,236,773 | B2 | 6/2007 | Thomas |
| 7,295,548 | B2 | 11/2007 | Blank et al. |
| 7,391,791 | B2 | 6/2008 | Balassanian et al. |
| 7,483,538 | B2 | 1/2009 | McCarty et al. |
| 7,558,822 | B2 | 7/2009 | Fredricksen et al. |
| 7,571,014 | B1 | 8/2009 | Lambourne et al. |
| 7,630,501 | B2 | 12/2009 | Blank et al. |
| 7,643,894 | B2 | 1/2010 | Braithwaite et al. |
| 7,657,910 | B1 | 2/2010 | McAulay et al. |
| 7,747,749 | B1 | 6/2010 | Erikson et al. |
| 7,797,471 | B2 | 9/2010 | Laefer et al. |
| 7,853,341 | B2 | 12/2010 | McCarty et al. |
| 7,949,707 | B2 | 5/2011 | McDowall et al. |
| 7,987,294 | B2 | 7/2011 | Bryce et al. |
| 7,995,899 | B2 | 8/2011 | Heredia et al. |
| 8,014,423 | B2 | 9/2011 | Thaler et al. |
| 8,045,952 | B2 | 10/2011 | Qureshey et al. |
| 8,103,009 | B2 | 1/2012 | McCarty et al. |
| 8,234,395 | B2 | 7/2012 | Millington |
| 8,271,114 | B2 | 9/2012 | Lydon et al. |
| 8,290,603 | B1* | 10/2012 | Lambourne ............ G11B 27/00 700/94 |
| 8,332,414 | B2 | 12/2012 | Nguyen et al. |
| 8,335,760 | B1 | 12/2012 | Kumar et al. |
| 8,483,853 | B1 | 7/2013 | Lambourne |
| 8,595,793 | B2 | 11/2013 | Kashyap et al. |
| 8,942,252 | B2 | 1/2015 | Balassanian et al. |
| 9,225,307 | B2 | 12/2015 | Reilly et al. |
| 9,494,683 | B1 | 11/2016 | Sadek |
| 9,552,361 | B2 | 1/2017 | Parekh et al. |
| 2001/0042107 | A1 | 11/2001 | Palm |
| 2001/0043592 | A1 | 11/2001 | Jimenez et al. |
| 2002/0022453 | A1 | 2/2002 | Balog et al. |
| 2002/0026442 | A1 | 2/2002 | Lipscomb et al. |
| 2002/0124097 | A1 | 9/2002 | Isely et al. |
| 2003/0157951 | A1 | 8/2003 | Hasty |
| 2004/0024478 | A1 | 2/2004 | Hans et al. |
| 2004/0138948 | A1* | 7/2004 | Loomis .................. H04H 60/82 700/94 |
| 2005/0138138 | A1 | 6/2005 | Jelinek et al. |
| 2007/0142944 | A1 | 6/2007 | Goldberg et al. |
| 2008/0005695 | A1 | 1/2008 | Ozzie et al. |
| 2008/0077261 | A1 | 3/2008 | Baudino et al. |
| 2008/0165396 | A1* | 7/2008 | Brodersen ............. H04N 5/765 358/509 |
| 2010/0107099 | A1 | 4/2010 | Frazier et al. |
| 2011/0087842 | A1 | 4/2011 | Lu et al. |
| 2011/0265003 | A1 | 10/2011 | Schubert et al. |
| 2011/0306304 | A1* | 12/2011 | Forutanpour ....... G06F 3/04883 455/67.11 |
| 2012/0070017 | A1 | 3/2012 | Dorogusker et al. |
| 2012/0254918 | A1 | 10/2012 | Takahashi |
| 2012/0263318 | A1* | 10/2012 | Millington ............... H04R 3/12 381/107 |
| 2012/0268145 | A1 | 10/2012 | Chandra et al. |
| 2013/0007235 | A1 | 1/2013 | Humphreys et al. |
| 2013/0022221 | A1 | 1/2013 | Kallai et al. |
| 2013/0275353 | A1 | 10/2013 | Ingrassia, Jr. et al. |
| 2013/0279878 | A1 | 10/2013 | Haverkamp |
| 2014/0123006 | A1 | 5/2014 | Chen et al. |
| 2014/0331332 | A1 | 11/2014 | Arrelid et al. |
| 2015/0066494 | A1 | 3/2015 | Salvador et al. |
| 2015/0334204 | A1 | 11/2015 | Bilinski et al. |

FOREIGN PATENT DOCUMENTS

| | | |
|---|---|---|
| EP | 2194471 A1 | 6/2010 |
| GB | 2459707 A | 11/2009 |
| JP | 2005352860 A | 12/2005 |
| JP | 2011066501 | 3/2011 |
| JP | 2012200953 A | 10/2012 |
| JP | 2013197659 A | 9/2013 |
| WO | 200153994 | 7/2001 |
| WO | 2003093950 A2 | 11/2003 |

OTHER PUBLICATIONS

AudioTron Reference Manual, Version 3.0, May 2002, 70 pages.
AudioTron Setup Guide, Version 3.0, May 2002, 38 pages.
Bluetooth. "Specification of the Bluetooth System: The ad hoc Scatternet for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Chinese Patent Office, Office Action dated Mar. 1, 2017, issued in connection with Chinese Patent Application No. 201480023649.3, 16 pages.
Chinese Patent Office, Second Office Action dated Oct. 24, 2017, issued in connection with Chinese Patent Application No. 201480023649.3, 6 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
European Patent Office, European Extended Search Report dated Mar. 7, 2016, issued in connection with EP Application No. 14757255.6, 7 pages.
European Patent Office, European Extended Search Report dated Aug. 2, 2017, issued in connection with EP Application No. 17000797.5, 7 pages.
European Patent Office, European Extended Search Report dated Nov. 22, 2019, issued in connection with European Application No. 19201852.1, 8 pages.
European Patent Office, Office Action dated Dec. 3, 2018, issued in connection with European Application No. 17000797.5, 7 pages.
Final Office Action dated Sep. 15, 2017, issued in connection with U.S. Appl. No. 14/850,778, filed Sep. 10, 2015, 6 pages.

(56) References Cited

OTHER PUBLICATIONS

First Action Interview Pilot Program Pre-Interview Communication dated Apr. 26, 2017, issued in connection with U.S. Appl. No. 14/850,778, filed Sep. 10, 2015, 5 pages.
International Bureau, International Preliminary Report on Patentability, dated Sep. 11, 2015, issued in connection with International Application No. PCT/US2014/018170, filed on Feb. 25, 2014, 7 pages.
International Searching Authority, International Search Report dated Jun. 26, 2014, issued in connection with International Application No. PCT/US2014/018170, filed on Feb. 25, 2014, 3 pages.
International Searching Authority, Written Opinion dated Jun. 26, 2014, issued in connection with International Application No. PCT/US2014/018170, filed on Feb. 25, 2014, 5 pages.
Japanese Patent Office, Decision of Rejection dated Jul. 4, 2017, issued in connection with Japanese Patent Application No. 2015-559054, 7 pages.
Japanese Patent Office, English Translation of Office Action dated Jul. 4, 2017, issued in connection with Japanese Patent Application No. 2015-559054, 4 pages.
Japanese Patent Office, Notice of Rejection dated Dec. 6, 2016, issued in connection with Japanese Application No. JP2015-5559054, 15 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Machine Translation of JP2005-352860A cited in Japanese Office Action dated Jul. 4, 2017, issued in connection with Japanese Patent Application No. 2015-559054, 5 pages.
Machine Translation of JP2011-66501A cited in Japanese Office Action dated Jul. 4, 2017, issued in connection with Japanese Patent Application No. 2015-559054, 54 pages.
Machine Translation of JP2013-197659A cited in Japanese Office Action dated Jul. 4, 2017, issued in connection with Japanese Patent Application No. 2015-559054, 26 pages.
Non-Final Office Action dated Mar. 11, 2015, issued in connection with U.S. Appl. No. 13/777,780, filed Feb. 26, 2013, 12 pages.
Notice of Allowance dated Dec. 6, 2017, issued in connection with U.S. Appl. No. 14/850,778, filed Sep. 10, 2015, 7 pages.
Notice of Allowance dated Oct. 16, 2019, issued in connection with U.S. Appl. No. 16/188,257, filed Nov. 12, 2018, 7 pages.
Notice of Allowance dated Jul. 21, 2015, issued in connection with U.S. Appl. No. 13/777,780, filed Feb. 26, 2013, 7 pages.
Notice of Allowance dated Sep. 26, 2018, issued in connection with U.S. Appl. No. 15/946,515, filed Apr. 5, 2018, 7 pages.
Palm, Inc., "Handbook for the Palm VII Handheld," May 2000, 311 pages.
Presentations at WinHEC 2000, May 2000, 138 pages.
U.S. Appl. No. 60/490,768, filed Jul. 28, 2003, entitled "Method for synchronizing audio playback between multiple networked devices," 13 pages.
U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.

\* cited by examiner

PRE-CACHING OF MEDIA

CROSS REFERENCE TO RELATED APPLICATIONS

This application is a continuation of U.S. non-provisional patent application Ser. No. 16/188,257, filed on Nov. 12, 2018, entitled "Pre-caching of Media," which is incorporated herein by reference in its entirety.

U.S. non-provisional patent application Ser. No. 16/188,257 is a continuation of U.S. non-provisional patent application Ser. No. 15/946,515, filed on Apr. 5, 2018, entitled "Pre-caching of Media in a Playback Queue," and issued as U.S. Pat. No. 10,127,010 on Nov. 13, 2018 which is incorporated herein by reference in its entirety.

U.S. non-provisional patent application Ser. No. 15/946,515 is a continuation of U.S. non-provisional patent application Ser. No. 14/850,778, filed on Sep. 10, 2015, entitled "Pre-Caching Media in a Playback Queue," issued as U.S. Pat. No. 9,940,092 on Apr. 10, 2018, which is incorporated herein by reference in its entirety.

U.S. non-provisional patent application Ser. No. 14/850,778 is a continuation of U.S. non-provisional patent application Ser. No. 13/777,780, filed on Feb. 26, 2013, entitled "Pre-Caching of Audio Content," issued as U.S. Pat. No. 9,195,432 on Nov. 24, 2015, which is incorporated herein by reference in its entirety.

FIELD OF THE DISCLOSURE

The disclosure is related to consumer goods and, more particularly, to systems, products, features, services, and other items directed to media playback or some aspect thereof.

BACKGROUND

Technological advancements have increased the accessibility of music content, as well as other types of media, such as television content, movies, and interactive content. For example, a user can access audio, video, or both audio and video content over the Internet through an online store, an Internet radio station, a music service, a movie service, and so on, in addition to the more traditional avenues of accessing audio and video content. Demand for audio, video, and both audio and video content inside and outside of the home continues to increase.

BRIEF DESCRIPTION OF THE DRAWINGS

Features, aspects, and advantages of the presently disclosed technology may be better understood with regard to the following description, appended claims, and accompanying drawings where:

Figure 1:
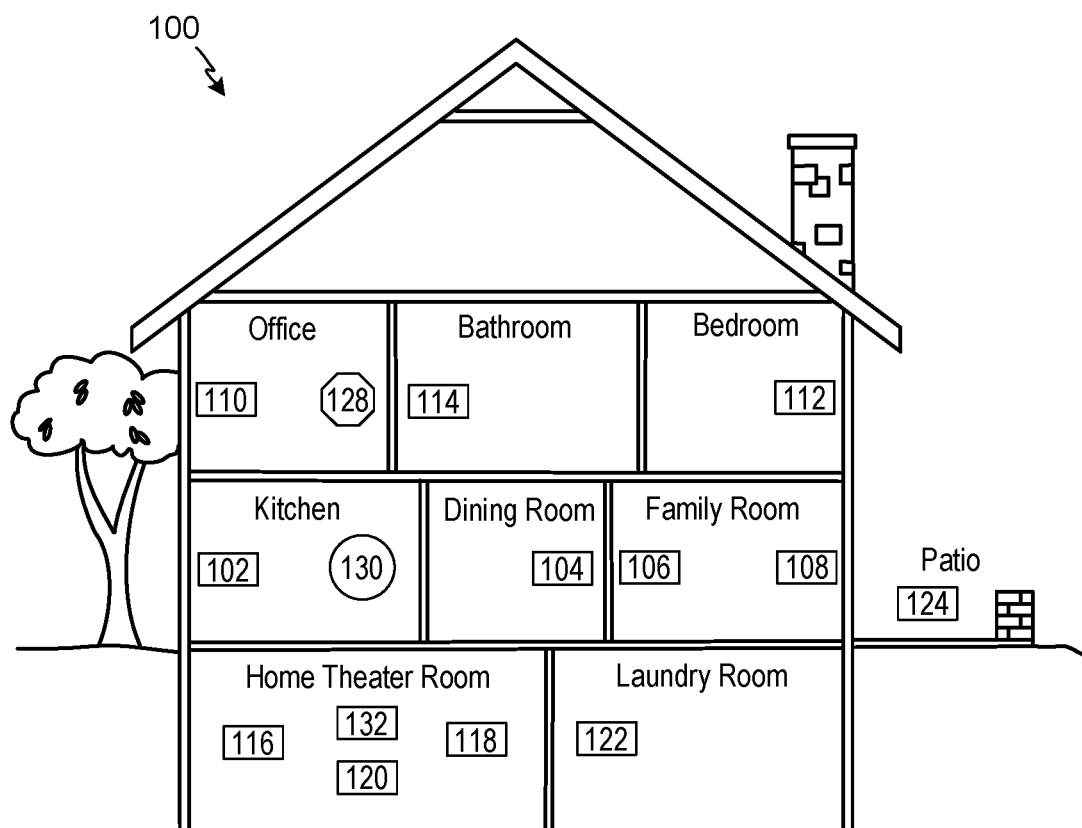
FIG. 1 shows an example configuration in which certain embodiments may be practiced.

In addition, the drawings are for the purpose of illustrating example embodiments, but it is understood that the inventions are not limited to the arrangements and instrumentality shown in the drawings.

DETAILED DESCRIPTION

I. Overview

Embodiments described herein may involve causing a playback device to pre-cache audio content when the playback device determines that a user may be about to cause the playback device to render the audio content. In discussions herein, the terms "pre-cache" or "pre-caching" may refer to any form of temporary data storage such that a future request for the data may be served faster. In some cases, the temporary data storage may be within a cache, such as a CPU cache, memory cache, or a disk cache.

In one example, the playback device may have one or more sensors capable of detecting the user's motion in relation to the playback device. As such, if the playback device detects that the user is near, or approaching the playback device, the playback device may pre-cache audio content that the user may wish to enjoy, such that the audio content may be immediately rendered once the user chooses to render the audio.

In one case, the one or more sensors may include proximity sensors and/or motion sensors, and may be implemented such that motion or presence of a user near a control panel may be detected. For instance, if the user's hand is approaching the control panel on the playback device, the one or more sensors may detect the approach. Upon detecting the approach of the hand, the playback device may determine that the user may wish to use the control panel to cause the playback device to render audio content. In one case, the playback device may be part of a bonded zone, and accordingly, causing the playback device to render audio content will cause all playback devices in the bonded zone to render the audio in synchrony.

The audio content that the user may wish to enjoy may be determined based on a playback status of the playback device. In one example, if the playback device is already rendering audio content, such as a song from a playlist, the next song from the playlist may be pre-cached. In another example, if the playback device was previously rendering audio content that is paused, then the audio content previously being rendered may be pre-cached beginning where the audio content was paused. In a further example, the audio content that was previously being rendered may not be stoppable or pausable. For instance, the previously rendered audio content may be live Internet radio that is being streamed over a network. In such a case, access to the radio stream may be re-established, and the radio stream may be pre-cached beginning when the presence of the user is detected.

In other examples, the one or more sensors may further be used to determine a motion or presence of a user near specific control panel elements. In one case, the control panel may include a "play/pause" button, a "next" button, and a "previous" button, and the one or more sensors may be used to determine which button the user is approaching. Accordingly, audio content may be pre-cached based on which button the user is approaching. For instance, if the playback device is rendering audio content from a playback queue, and an approach of the user towards the previous button is detected, a previous audio content in the playback queue may be pre-cached.

As indicated above, the present application involves causing a playback device to pre-cache audio content when the playback device determines that a user may be about to cause the playback device to render the audio content. In one aspect, a first method is provided. The first method involves detecting, by a proximity sensor on a playback device, movement in relation to the playback device, responsively retrieving audio content by the playback device from a networked audio source, prior to receiving a user command to play the audio content, and storing the audio content in memory on the playback device. The audio content may be stored in memory in preparation for playback.

In another aspect, a device is provided. The device includes a proximity sensor, a processor, a storage memory, and a computer readable medium having stored thereon instructions executable by the processor to perform function. The functions include detecting, by the proximity sensor, movement in relation to the device, responsively retrieving audio content from a networked audio source prior to receiving a user command to play the audio content, and storing the audio content in the storage memory. The audio content may be stored in memory in preparation for playback.

In a further aspect, a non-transitory computer readable memory is provided. The non-transitory computer readable memory has stored thereon instructions executable by a processor to cause the processor to execute functions. The functions include detecting, by a proximity sensor on a playback device, movement in relation to the playback device, responsively retrieving audio content by the playback device from a networked audio source prior to receiving a user command to play the audio content, and storing the audio content in memory on the playback device. The audio content may be stored in memory in preparation for playback.

Other embodiments, as those discussed in the following and others as can be appreciated by one having ordinary skill in the art are also possible.

II. Example Operating Environment

Referring now to the drawings, in which like numerals can refer to like parts throughout the figures, FIG. 1 shows an example media system configuration 100 in which one or more embodiments disclosed herein can be practiced or implemented.

By way of illustration, the media system configuration 100 represents a home with multiple zones, though the home could have been configured with only one zone. Each zone, for example, may represent a different room or space, such as an office, bathroom, bedroom, kitchen, dining room, family room, home theater room, utility or laundry room, and patio. A single zone might also include multiple rooms or spaces if so configured. One or more of zone players 102-124 are shown in each respective zone. A zone player 102-124, also referred to as a playback device, multimedia unit, speaker, player, and so on, provides audio, video, and/or audiovisual output. A controller 130 (e.g., shown in the kitchen for purposes of illustration) provides control to the media system configuration 100. Controller 130 may be fixed to a zone, or alternatively, mobile such that it can be moved about the zones. The media system configuration 100 may also include more than one controller 130. The media system configuration 100 illustrates an example whole house media system, though it is understood that the technology described herein is not limited to its particular place of application or to an expansive system like a whole house media system 100 of FIG. 1.

a. Example Zone Players

Figure 2A:
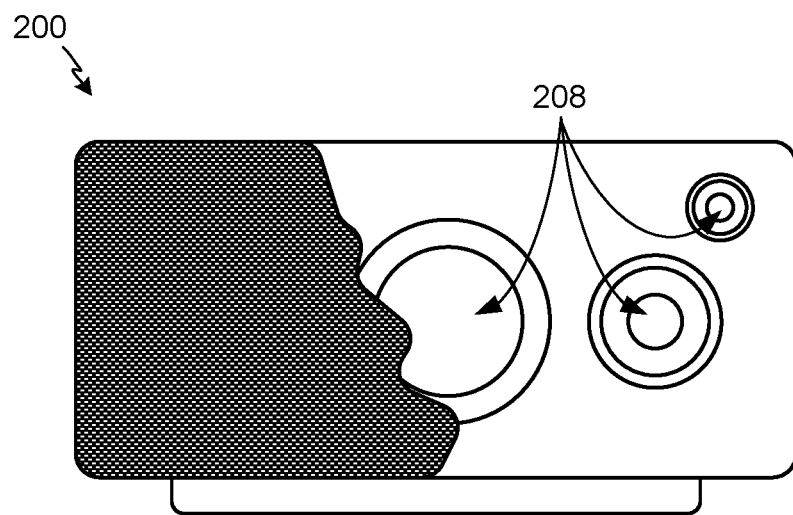
FIG. 2A shows an illustration of an example zone player having a built-in amplifier and transducers.
Figure 2B:
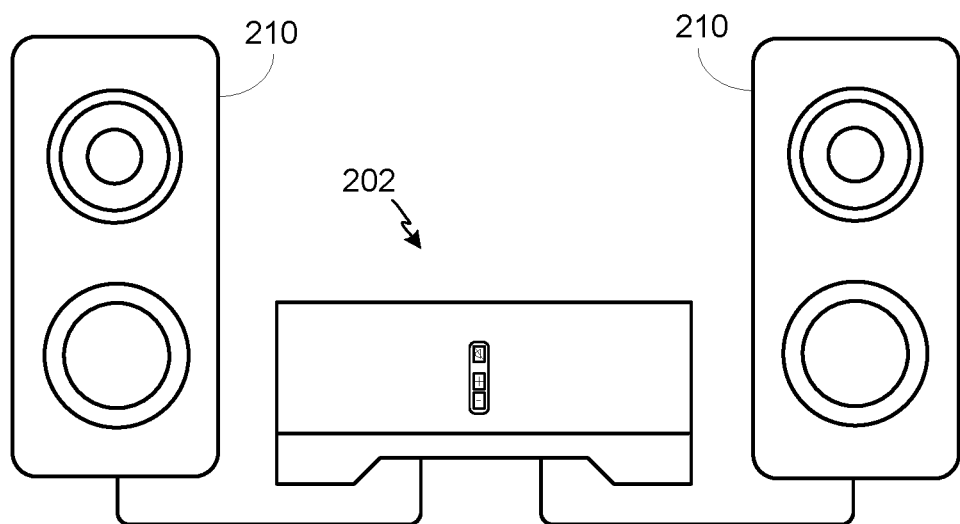
FIG. 2B shows an illustration of an example zone player having a built-in amplifier and connected to external speakers.
Figure 2C:
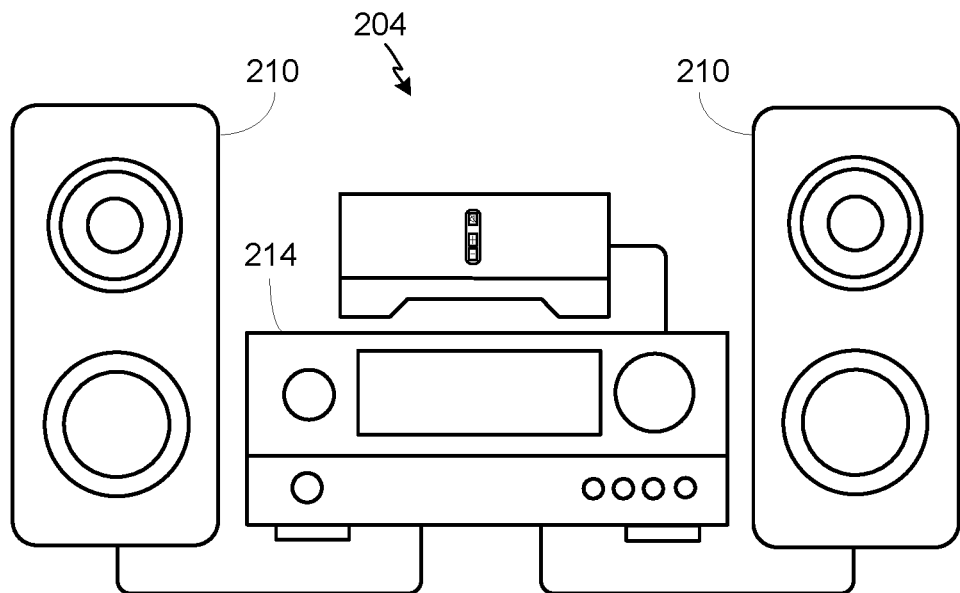
FIG. 2C shows an illustration of an example zone player connected to an A/V receiver and speakers.

FIGS. 2A, 2B, and 2C show example types of zone players. Zone players 200, 202, and 204 of FIGS. 2A, 2B, and 2C, respectively, can correspond to any of the zone players 102-124 of FIG. 1, for example. In some embodiments, audio is reproduced using only a single zone player, such as by a full-range player. In some embodiments, audio is reproduced using two or more zone players, such as by using a combination of full-range players or a combination of full-range and specialized players. In some embodiments, zone players 200-204 may also be referred to as a "smart speaker," because they contain processing capabilities beyond the reproduction of audio, more of which is described below.

FIG. 2A illustrates zone player 200 that includes sound producing equipment 208 capable of reproducing full-range sound. The sound may come from an audio signal that is received and processed by zone player 200 over a wired or wireless data network. Sound producing equipment 208 includes one or more built-in amplifiers and one or more acoustic transducers (e.g., speakers). A built-in amplifier is described more below with respect to FIG. 4. A speaker or acoustic transducer can include, for example, any of a tweeter, a mid-range driver, a low-range driver, and a subwoofer. In some embodiments, zone player 200 can be statically or dynamically configured to play stereophonic audio, monaural audio, or both. In some embodiments, zone player 200 is configured to reproduce a subset of full-range sound, such as when zone player 200 is grouped with other zone players to play stereophonic audio, monaural audio, and/or surround audio or when the audio content received by zone player 200 is less than full-range.

FIG. 2B illustrates zone player 202 that includes a built-in amplifier to power a set of detached speakers 210. A detached speaker can include, for example, any type of loudspeaker. Zone player 202 may be configured to power one, two, or more separate loudspeakers. Zone player 202 may be configured to communicate an audio signal (e.g., right and left channel audio or more channels depending on its configuration) to the detached speakers 210 via a wired path.

FIG. 2C illustrates zone player 204 that does not include a built-in amplifier, but is configured to communicate an audio signal, received over a data network, to an audio (or "audio/video") receiver 214 with built-in amplification.

Referring back to FIG. 1, in some embodiments, one, some, or all of the zone players 102 to 124 can retrieve audio directly from a source. For example, a zone player may contain a playlist or queue of audio items to be played (also referred to herein as a "playback queue"). Each item in the queue may comprise a uniform resource identifier (URI) or some other identifier. The URI or identifier can point the zone player to the audio source. The source might be found on the Internet (e.g., the cloud), locally from another device over data network 128 (described further below), from the controller 130, stored on the zone player itself, or from an audio source communicating directly to the zone player. In some embodiments, the zone player can reproduce the audio itself, send it to another zone player for reproduction, or both where the audio is played by the zone player and one or more additional zone players in synchrony. In some embodiments, the zone player can play a first audio content (or not play at all), while sending a second, different audio content to another zone player(s) for reproduction.

By way of illustration, SONOS, Inc. of Santa Barbara, Calif. presently offers for sale zone players referred to as a "PLAYBAR," "PLAY:5," "PLAY:3," "CONNECT:AMP," "CONNECT," and "SUB." Any other past, present, and/or future zone players can additionally or alternatively be used to implement the zone players of example embodiments disclosed herein. Additionally, it is understood that a zone player is not limited to the particular examples illustrated in FIGS. 2A, 2B, and 2C or to the SONOS product offerings. For example, a zone player may include a wired or wireless headphone. In yet another example, a zone player might include a sound bar for television. In yet another example, a zone player can include or interact with a docking station for an Apple IPOD™ or similar device.

b. Example Controllers

Figure 3:
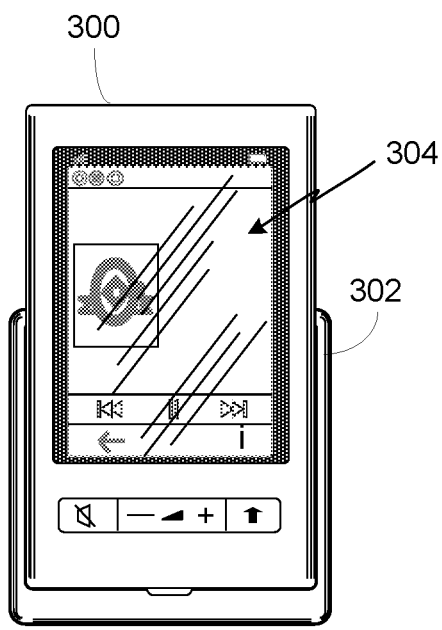
FIG. 3 shows an illustration of an example controller.

FIG. 3 illustrates an example wireless controller 300 in docking station 302. By way of illustration, controller 300 may correspond to controlling device 130 of FIG. 1. Docking station 302, if provided, may be used to charge a battery of controller 300. In some embodiments, controller 300 may be provided with a touch screen 304 that allows a user to interact through touch with the controller 300, for example, to retrieve and navigate a playlist of audio items, control operations of one or more zone players, and provide overall control of the system configuration 100. In certain embodiments, any number of controllers can be used to control the system configuration 100. In some embodiments, there may be a limit set on the number of controllers that can control the system configuration 100. The controllers might be wireless like wireless controller 300 or wired to data network 128.

In some embodiments, if more than one controller is used in system 100, each controller may be coordinated to display common content, and may all be dynamically updated to indicate changes made from a single controller. Coordination can occur, for instance, by a controller periodically requesting a state variable directly or indirectly from one or more zone players; the state variable may provide information about system 100, such as current zone group configuration, what is playing in one or more zones, volume levels, and other items of interest. The state variable may be passed around on data network 128 between zone players (and controllers, if so desired) as needed or as often as programmed.

In addition, an application running on any network-enabled portable device, such as an IPHONE™, IPAD™, ANDROID™ powered phone, or any other smart phone or network-enabled device can be used as controller 130. An application running on a laptop or desktop personal computer (PC) or Mac™ can also be used as controller 130. Such controllers may connect to system 100 through an interface with data network 128, a zone player, a wireless router, or using some other configured connection path. Example controllers offered by Sonos, Inc. of Santa Barbara, Calif. include a "Controller 200," "SONOS® CONTROL," "SONOS® Controller for IPHONE™," "SONOS® Controller for IPAD™," "SONOS® Controller for ANDROID™," "SONOS® Controller for MAC™ or PC."

c. Example Data Connection

Zone players 102 to 124 of FIG. 1 are coupled directly or indirectly to a data network, such as data network 128. Controller 130 may also be coupled directly or indirectly to data network 128 or individual zone players. Data network 128 is represented by an octagon in the figure to stand out from other representative components. While data network 128 is shown in a single location, it is understood that such a network is distributed in and around system 100. Particularly, data network 128 can be a wired network, a wireless network, or a combination of both wired and wireless networks. In some embodiments, one or more of the zone players 102-124 are wirelessly coupled to data network 128 based on a proprietary mesh network. In some embodiments, one or more of the zone players 102-124 are wirelessly coupled to data network 128 using a non-mesh topology. In some embodiments, one or more of the zone players 102-124 are coupled via a wire to data network 128 using Ethernet or similar technology. In addition to the one or more zone players 102-124 connecting to data network 128, data network 128 can further allow access to a wide area network, such as the Internet.

In some embodiments, connecting any of the zone players 102-124, or some other connecting device, to a broadband router, can create data network 128. Other zone players 102-124 can then be added wired or wirelessly to the data network 128. For example, a zone player (e.g., any of zone players 102-124) can be added to the system configuration 100 by simply pressing a button on the zone player itself (or perform some other action), which enables a connection to be made to data network 128. The broadband router can be connected to an Internet Service Provider (ISP), for example. The broadband router can be used to form another data network within the system configuration 100, which can be used in other applications (e.g., web surfing). Data network 128 can also be used in other applications, if so programmed. An example, second network may implement SONOSNET™ protocol, developed by SONOS, Inc. of Santa Barbara. SONOSNET™ represents a secure, AES-encrypted, peer-to-peer wireless mesh network. Alternatively, in certain embodiments, the data network 128 is the same network, such as a traditional wired or wireless network, used for other applications in the household.

d. Example Zone Configurations

A particular zone can contain one or more zone players. For example, the family room of FIG. 1 contains two zone players 106 and 108, while the kitchen is shown with one zone player 102. In another example, the home theater room contains additional zone players to play audio from a 5.1 channel or greater audio source (e.g., a movie encoded with 5.1 or greater audio channels). In some embodiments, one can position a zone player in a room or space and assign the zone player to a new or existing zone via controller 130. As such, zones may be created, combined with another zone, removed, and given a specific name (e.g., "Kitchen"), if so desired and programmed to do so with controller 130. Moreover, in some embodiments, zone configurations may be dynamically changed even after being configured using controller 130 or some other mechanism.

In some embodiments, if a zone contains two or more zone players, such as the two zone players 106 and 108 in the family room, then the two zone players 106 and 108 can be configured to play the same audio source in synchrony, or the two zone players 106 and 108 can be paired to play two separate sounds in left and right channels, for example. In other words, the stereo effects of a sound can be reproduced or enhanced through the two zone players 106 and 108, one for the left sound and the other for the right sound. In certain embodiments, paired zone players (also referred to as "bonded zone players") can play audio in synchrony with other zone players in the same or different zones.

In some embodiments, two or more zone players can be sonically consolidated to form a single, consolidated zone player. A consolidated zone player (though made up of multiple, separate devices) can be configured to process and reproduce sound differently than an unconsolidated zone player or zone players that are paired, because a consolidated zone player will have additional speaker drivers from which sound can be passed. The consolidated zone player can further be paired with a single zone player or yet another consolidated zone player. Each playback device of a consolidated playback device can be set in a consolidated mode, for example.

According to some embodiments, one can continue to do any of: group, consolidate, and pair zone players, for example, until a desired configuration is complete. The actions of grouping, consolidation, and pairing are preferably performed through a control interface, such as using controller 130, and not by physically connecting and re-connecting speaker wire, for example, to individual, discrete speakers to create different configurations. As such, certain embodiments described herein provide a more flexible and dynamic platform through which sound reproduction can be offered to the end-user.

e. Example Audio Sources

In some embodiments, each zone can play from the same audio source as another zone or each zone can play from a different audio source. For example, someone can be grilling on the patio and listening to jazz music via zone player 124, while someone is preparing food in the kitchen and listening to classical music via zone player 102. Further, someone can be in the office listening to the same jazz music via zone player 110 that is playing on the patio via zone player 124. In some embodiments, the jazz music played via zone players 110 and 124 is played in synchrony. Synchronizing playback amongst zones allows for someone to pass through zones while seamlessly (or substantially seamlessly) listening to the audio. Further, zones can be put into a "party mode" such that all associated zones will play audio in synchrony.

Sources of audio content to be played by zone players 102-124 are numerous. In some embodiments, music on a zone player itself may be accessed and a played. In some embodiments, music from a personal library stored on a computer or networked-attached storage (NAS) may be accessed via the data network 128 and played. In some embodiments, Internet radio stations, shows, and podcasts can be accessed via the data network 128. Music or cloud services that let a user stream and/or download music and audio content can be accessed via the data network 128. Further, music can be obtained from traditional sources, such as a turntable or CD player, via a line-in connection to a zone player, for example. Audio content can also be accessed using a different protocol, such as AIRPLAY™, which is a wireless technology by Apple, Inc., for example. Audio content received from one or more sources can be shared amongst the zone players 102 to 124 via data network 128 and/or controller 130. The above-disclosed sources of audio content are referred to herein as network-based audio information sources. However, network-based audio information sources are not limited thereto.

In some embodiments, the example home theater zone players 116, 118, 120 are coupled to an audio information source such as a television 132. In some examples, the television 132 is used as a source of audio for the home theater zone players 116, 118, 120, while in other examples audio information from the television 132 can be shared with any of the zone players 102-124 in the audio system 100.

III. Example Zone Players

Figure 4:
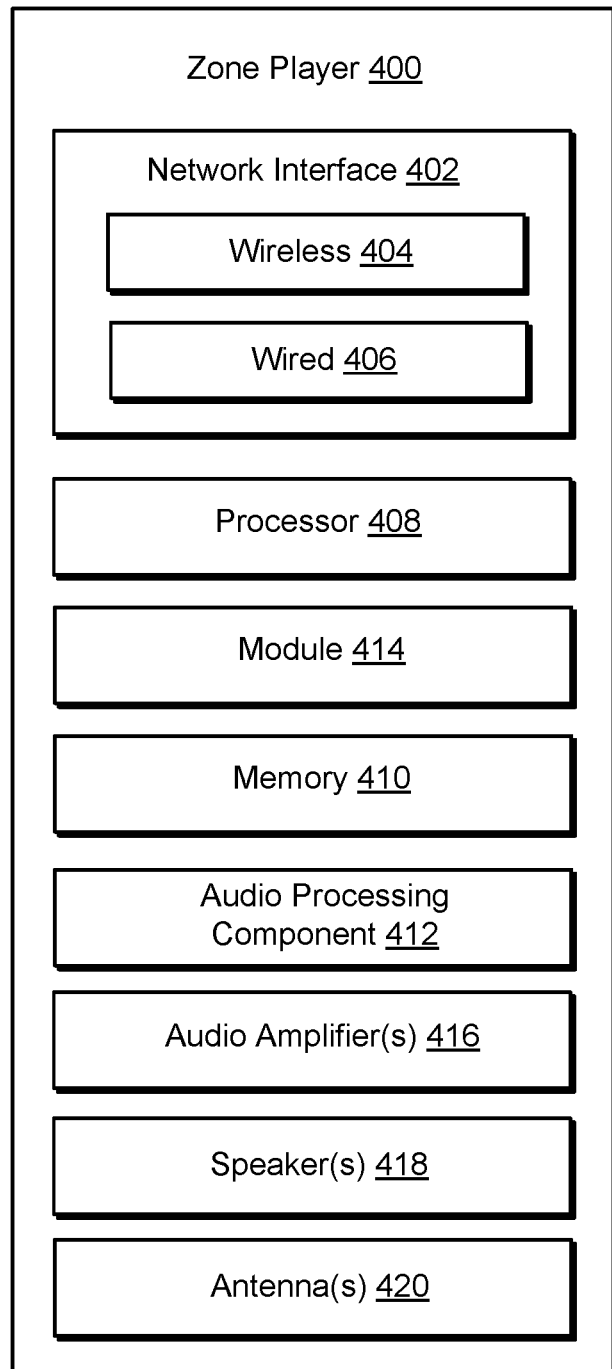
FIG. 4 shows an internal functional block diagram of an example zone player.

Referring now to FIG. 4, there is shown an example block diagram of a zone player 400 in accordance with an embodiment. Zone player 400 includes a network interface 402, a processor 408, a memory 410, an audio processing component 412, one or more modules 414, an audio amplifier 416, and a speaker unit 418 coupled to the audio amplifier 416. FIG. 2A shows an example illustration of such a zone player. Other types of zone players may not include the speaker unit 418 (e.g., such as shown in FIG. 2B) or the audio amplifier 416 (e.g., such as shown in FIG. 2C). Further, it is contemplated that the zone player 400 can be integrated into another component. For example, the zone player 400 could be constructed as part of a television, lighting, or some other device for indoor or outdoor use.

In some embodiments, network interface 402 facilitates a data flow between zone player 400 and other devices on a data network 128. In some embodiments, in addition to getting audio from another zone player or device on data network 128, zone player 400 may access audio directly from the audio source, such as over a wide area network or on the local network. In some embodiments, the network interface 402 can further handle the address part of each packet so that it gets to the right destination or intercepts packets destined for the zone player 400. Accordingly, in certain embodiments, each of the packets includes an Internet Protocol (IP)-based source address as well as an IP-based destination address.

In some embodiments, network interface 402 can include one or both of a wireless interface 404 and a wired interface 406. The wireless interface 404, also referred to as a radio frequency (RF) interface, provides network interface functions for the zone player 400 to wirelessly communicate with other devices (e.g., other zone player(s), speaker(s), receiver(s), component(s) associated with the data network 128, and so on) in accordance with a communication protocol (e.g., any wireless standard including IEEE 802.11a, 802.11b, 802.11g, 802.11n, or 802.15). Wireless interface 404 may include one or more radios. To receive wireless signals and to provide the wireless signals to the wireless interface 404 and to transmit wireless signals, the zone player 400 includes one or more antennas 420. The wired interface 406 provides network interface functions for the zone player 400 to communicate over a wire with other devices in accordance with a communication protocol (e.g., IEEE 802.3). In some embodiments, a zone player includes multiple wireless 404 interfaces. In some embodiments, a zone player includes multiple wired 406 interfaces. In some embodiments, a zone player includes both of the interfaces 404 and 406. In some embodiments, a zone player 400 includes only the wireless interface 404 or the wired interface 406.

In some embodiments, the processor 408 is a clock-driven electronic device that is configured to process input data according to instructions stored in memory 410. The memory 410 is data storage that can be loaded with one or more software module(s) 414, which can be executed by the processor 408 to achieve certain tasks. In the illustrated embodiment, the memory 410 is a tangible machine-readable medium storing instructions that can be executed by the processor 408. In some embodiments, a task might be for the zone player 400 to retrieve audio data from another zone player or a device on a network (e.g., using a uniform resource locator (URL) or some other identifier). In some embodiments, a task may be for the zone player 400 to send audio data to another zone player or device on a network. In some embodiments, a task may be for the zone player 400 to synchronize playback of audio with one or more additional zone players. In some embodiments, a task may be to pair the zone player 400 with one or more zone players to create a multi-channel audio environment. Additional or alternative tasks can be achieved via the one or more software module(s) 414 and the processor 408.

The audio processing component 412 can include one or more digital-to-analog converters (DAC), an audio preprocessing component, an audio enhancement component or a digital signal processor, and so on. In some embodiments, the audio processing component 412 may be part of processor 408. In some embodiments, the audio that is retrieved via the network interface 402 is processed and/or intentionally altered by the audio processing component 412. Further, the audio processing component 412 can produce analog audio signals. The processed analog audio signals are then provided to the audio amplifier 416 for play back through speakers 418. In addition, the audio processing component 412 can include circuitry to process analog or digital signals as inputs to play from zone player 400, send to another zone player on a network, or both play and send to another zone player on the network. An example input includes a line-in connection (e.g., an auto-detecting 3.5 mm audio line-in connection).

The audio amplifier 416 is a device(s) that amplifies audio signals to a level for driving one or more speakers 418. The one or more speakers 418 can include an individual transducer (e.g., a "driver") or a complete speaker system that includes an enclosure including one or more drivers. A particular driver can be a subwoofer (e.g., for low frequencies), a mid-range driver (e.g., for middle frequencies), and a tweeter (e.g., for high frequencies), for example. An enclosure can be sealed or ported, for example. Each transducer may be driven by its own individual amplifier.

A commercial example, presently known as the PLAY: 5™, is a zone player with a built-in amplifier and speakers that is capable of retrieving audio directly from the source, such as on the Internet or on the local network, for example. In particular, the PLAY:5™ is a five-amp, five-driver speaker system that includes two tweeters, two mid-range drivers, and one woofer. When playing audio content via the PLAY:5, the left audio data of a track is sent out of the left tweeter and left mid-range driver, the right audio data of a track is sent out of the right tweeter and the right mid-range driver, and mono bass is sent out of the subwoofer. Further, both mid-range drivers and both tweeters have the same equalization (or substantially the same equalization). That is, they are both sent the same frequencies but from different channels of audio. Audio from Internet radio stations, online music and video services, downloaded music, analog audio inputs, television, DVD, and so on, can be played from the PLAY:5™.

IV. Example Controller

Figure 5:
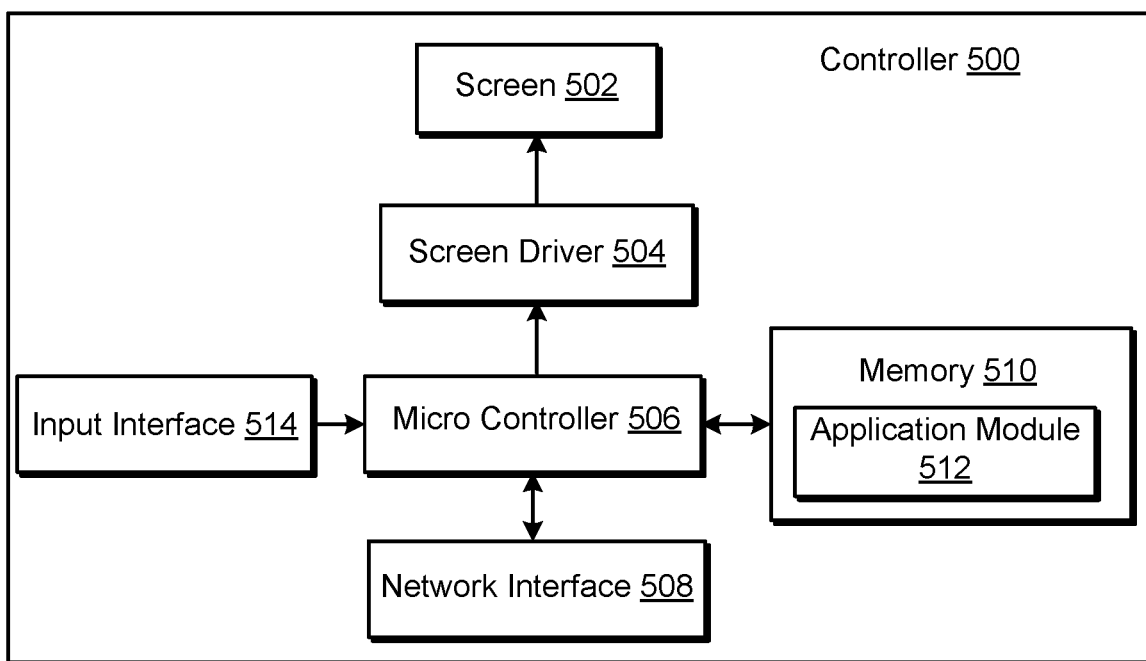
FIG. 5 shows an internal functional block diagram of an example controller.

Referring now to FIG. 5, there is shown an example block diagram for controller 500, which can correspond to the controlling device 130 in FIG. 1. Controller 500 can be used to facilitate the control of multi-media applications, automation and others in a system. In particular, the controller 500 may be configured to facilitate a selection of a plurality of audio sources available on the network and enable control of one or more zone players (e.g., the zone players 102-124 in FIG. 1) through a wireless or wired network interface 508. According to one embodiment, the wireless communications is based on an industry standard (e.g., infrared, radio, wireless standards including IEEE 802.11a, 802.11b, 802.11g, 802.11n, 802.15, and so on). Further, when a particular audio is being accessed via the controller 500 or being played via a zone player, a picture (e.g., album art) or any other data, associated with the audio and/or audio source can be transmitted from a zone player or other electronic device to controller 500 for display.

Controller 500 is provided with a screen 502 and an input interface 514 that allows a user to interact with the controller 500, for example, to navigate a playlist of many multimedia items and to control operations of one or more zone players. The screen 502 on the controller 500 can be an LCD screen, for example. The screen 500 communicates with and is commanded by a screen driver 504 that is controlled by a microcontroller (e.g., a processor) 506. The memory 510 can be loaded with one or more application modules 512 that can be executed by the microcontroller 506 with or without a user input via the user interface 514 to achieve certain tasks. In some embodiments, an application module 512 is configured to facilitate grouping a number of selected zone players into a zone group and synchronizing the zone players for audio play back. In some embodiments, an application module 512 is configured to control the audio sounds (e.g., volume) of the zone players in a zone group. In operation, when the microcontroller 506 executes one or more of the application modules 512, the screen driver 504 generates control signals to drive the screen 502 to display an application specific user interface accordingly.

The controller 500 includes a network interface 508 that facilitates wired or wireless communication with a zone player. In some embodiments, the commands such as volume control and audio playback synchronization are sent via the network interface 508. In some embodiments, a saved zone group configuration is transmitted between a zone player and a controller via the network interface 508. The controller 500 can control one or more zone players, such as 102-124 of FIG. 1. There can be more than one controller for a particular system, and each controller may share common information with another controller, or retrieve the common information from a zone player, if such a zone player stores configuration data (e.g., such as a state variable). Further, a controller can be integrated into a zone player.

It should be noted that other network-enabled devices such as an IPHONE™ IPAD™ or any other smart phone or network-enabled device (e.g., a networked computer such as a PC or MAC™) can also be used as a controller to interact or control zone players in a particular environment. In some embodiments, a software application or upgrade can be downloaded onto a network-enabled device to perform the functions described herein.

In certain embodiments, a user using the controller 500 can create a zone group including at least two zone players. The zone players in the zone group can play audio in a synchronized fashion, such that all of the zone players in the zone group play back an identical audio source or a list of identical audio sources in a synchronized manner such that no (or substantially no) audible delays or hiccups are to be heard. Similarly, in some embodiments, when a user increases the audio volume of the group from the controller 500, the signals or data of increasing the audio volume for the group are sent to one of the zone players and causes other zone players in the group to be increased together in volume.

A user via the controller 500 can group zone players into a zone group by activating a "Link Zones" or "Add Zone" soft button, or de-grouping a zone group by activating an "Unlink Zones" or "Drop Zone" button. For example, one mechanism for 'joining' zone players together for audio play back is to link a number of zone players together to form a group. To link a number of zone players together, a user can manually link each zone player or room one after the other. For example, assume that there is a multi-zone system that includes the following zones: Bathroom, Bedroom, Den, Dining Room, Family Room, and Foyer.

In certain embodiments, a user can link any number of the six zone players, for example, by starting with a single zone and then manually linking each zone to that zone.

In certain embodiments, a set of zones can be dynamically linked together using a command to create a zone scene or theme (subsequent to first creating the zone scene). For instance, a "Morning" zone scene command can link the Bedroom, Office, and Kitchen zones together in one action. Without this single command, the user would manually and individually link each zone. The single command may include a mouse click, a double mouse click, a button press, a gesture, or some other programmed action. Other kinds of zone scenes can be programmed.

In certain embodiments, a zone scene can be triggered based on time (e.g., an alarm clock function). For instance, a zone scene can be set to apply at 8:00 am. The system can link appropriate zones automatically, set specific music to play, and then stop the music after a defined duration. Although any particular zone can be triggered to an "On" or "Off" state based on time, for example, a zone scene enables any zone(s) linked to the scene to play a predefined audio (e.g., a favorable song, a predefined playlist) at a specific time and/or for a specific duration. If, for any reason, the scheduled music failed to be played (e.g., an empty playlist, no connection to a share, failed Universal Plug and Play (UPnP), no Internet connection for an Internet Radio station, and so on), a backup buzzer can be programmed to sound. The buzzer can include a sound file that is stored in a zone player, for example.

V. Example Ad-Hoc Network

Figure 6:
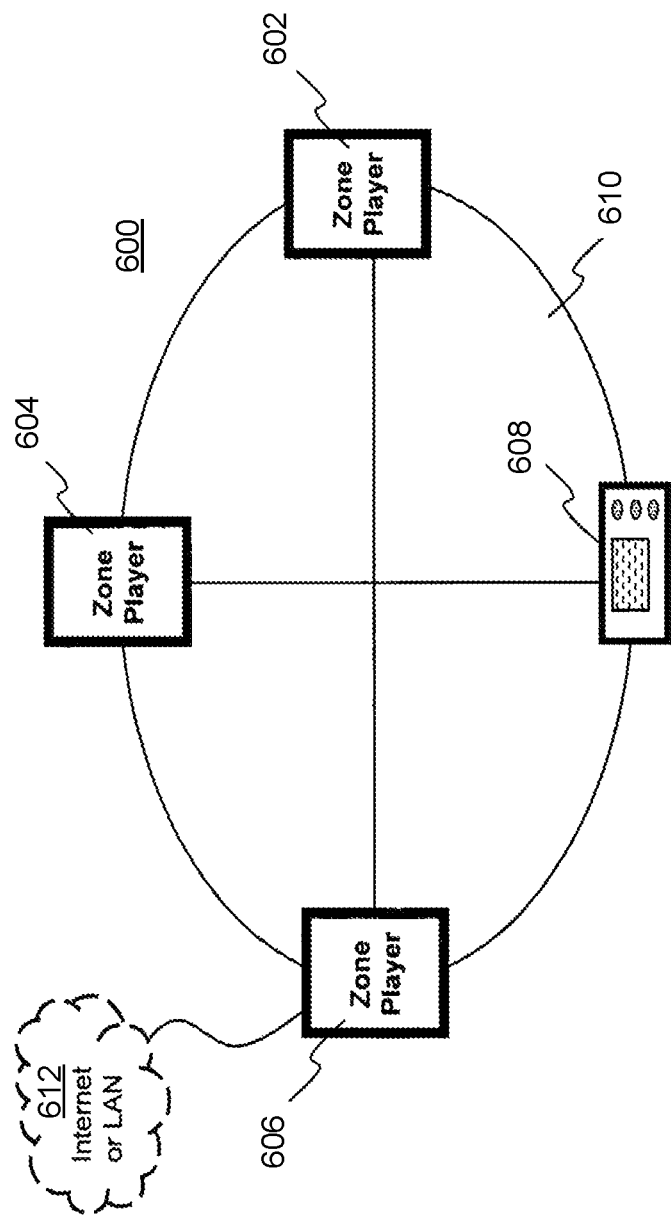
FIG. 6 shows an example ad-hoc playback network.

Certain particular examples are now provided in connection with FIG. 6 to describe, for purposes of illustration, certain systems and methods to provide and facilitate connection to a playback network. FIG. 6 shows that there are three zone players 602, 604 and 606 and a controller 608 that form a network branch that is also referred to as an Ad-Hoc network 610. The network 610 may be wireless, wired, or a combination of wired and wireless. In general, an Ad-Hoc (or "spontaneous") network is a local area network or other small network in which there is generally no one access point for all traffic. With an established Ad-Hoc network 610, the devices 602, 604, 606 and 608 can all communicate with each other in a "peer-to-peer" style of communication, for example. Furthermore, devices may join and/or leave from the network 610, and the network 610 will automatically reconfigure itself without needing the user to reconfigure the network 610. While an Ad-Hoc network is referenced in FIG. 6, it is understood that a playback network may be based on a type of network that is completely or partially different from an Ad-Hoc network.

Using the Ad-Hoc network 610, the devices 602, 604, 606, and 608 can share or exchange one or more audio sources and be dynamically grouped to play the same or different audio sources. For example, the devices 602 and 604 are grouped to playback one piece of music, and at the same time, the device 606 plays back another piece of music.

In other words, the devices 602, 604, 606 and 608, as shown in FIG. 6, form a HOUSEHOLD that distributes audio and/or reproduces sound. As used herein, the term HOUSEHOLD (provided in uppercase letters to disambiguate from the user's domicile) is used to represent a collection of networked devices that are cooperating to provide an application or service. An instance of a HOUSEHOLD is identified with a household 610 (or household identifier), though a HOUSEHOLD may be identified with a different area or place.

In certain embodiments, a household identifier (HHID) is a short string or an identifier that is computer-generated to help ensure that it is unique. Accordingly, the network 610 can be characterized by a unique HHID and a unique set of configuration variables or parameters, such as channels (e.g., respective frequency bands), service set identifier (SSID) (a sequence of alphanumeric characters as a name of a wireless network), and WEP keys (wired equivalent privacy or other security keys). In certain embodiments, SSID is set to be the same as HHID.

In certain embodiments, each HOUSEHOLD includes two types of network nodes: a control point (CP) and a zone player (ZP). The control point controls an overall network setup process and sequencing, including an automatic generation of required network parameters (e.g., WEP keys). In an embodiment, the CP also provides the user with a HOUSEHOLD configuration user interface. The CP function can be provided by a computer running a CP application module, or by a handheld controller (e.g., the controller 308) also running a CP application module, for example. The zone player is any other device on the network that is placed to participate in the automatic configuration process. The ZP, as a notation used herein, includes the controller 308 or a computing device, for example. In some embodiments, the functionality, or certain parts of the functionality, in both the CP and the ZP are combined at a single node (e.g., a ZP contains a CP or vice-versa).

In certain embodiments, configuration of a HOUSEHOLD involves multiple CPs and ZPs that rendezvous and establish a known configuration such that they can use a standard networking protocol (e.g., IP over Wired or Wireless Ethernet) for communication. In an embodiment, two types of networks/protocols are employed: Ethernet 802.3 and Wireless 802.11g. Interconnections between a CP and a ZP can use either of the networks/protocols. A device in the system as a member of a HOUSEHOLD can connect to both networks simultaneously.

In an environment that has both networks in use, it is assumed that at least one device in a system is connected to both as a bridging device, thus providing bridging services between wired/wireless networks for others. The zone player 606 in FIG. 6 is shown to be connected to both networks, for example. The connectivity to the network 612 is based on Ethernet and/or Wireless, while the connectivity to other devices 602, 604 and 608 is based on Wireless and Ethernet if so desired.

It is understood, however, that in some embodiments each zone player 606, 604, 602 may access the Internet when retrieving media from the cloud (e.g., the Internet) via the bridging device. For example, zone player 602 may contain a uniform resource locator (URL) that specifies an address to a particular audio track in the cloud. Using the URL, the zone player 602 may retrieve the audio track from the cloud, and ultimately play the audio out of one or more zone players.

VI. Example System Configuration

Figure 7:
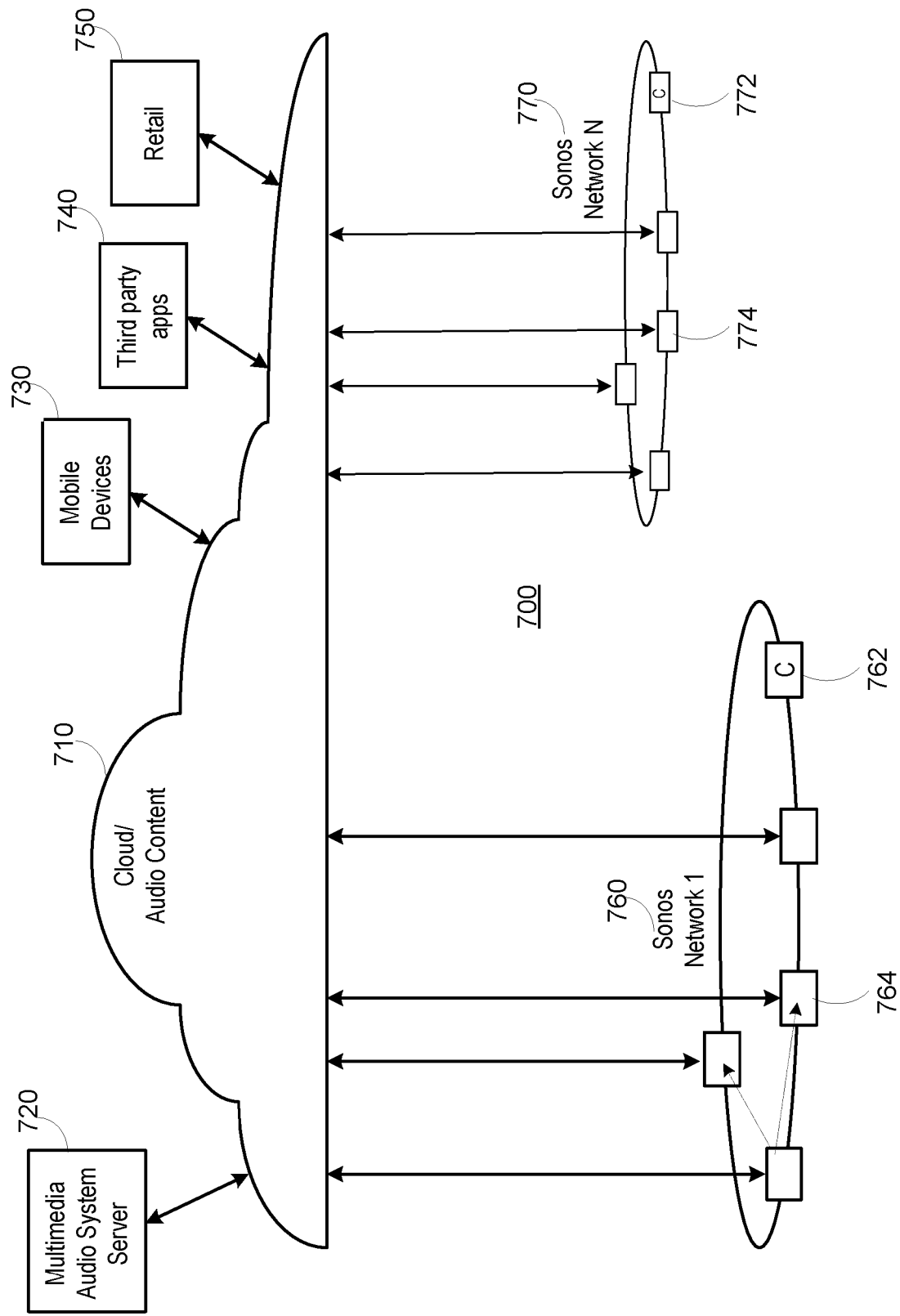
FIG. 7 shows a system including a plurality of networks including a cloud-based network and at least one local playback network.

FIG. 7 shows a system including a plurality of networks including a cloud-based network and at least one local playback network. A local playback network includes a plurality of playback devices or players, though it is understood that the playback network may contain only one playback device. In certain embodiments, each player has an ability to retrieve its content for playback. Control and content retrieval can be distributed or centralized, for example. Input can include streaming content provider input, third party application input, mobile device input, user input, and/or other playback network input into the cloud for local distribution and playback.

As illustrated by the example system 700 of FIG. 7, a plurality of content providers 720-750 can be connected to one or more local playback networks 760-770 via a cloud and/or other network 710. Using the cloud 710, a multimedia audio system server 720, a mobile device 730, a third party application 740, a content provider 750 and so on can provide multimedia content (requested or otherwise) to local playback networks 760, 770. Within each local playback network 760, 770, a controller 762, 772 and a playback device 764, 774 can be used to playback audio content.

VII. Example Method for Pre-caching Audio Content

As discussed above, embodiments are described herein that may cause a playback device to pre-cache audio content in anticipation of user-input to cause the playback device to render the audio content. The pre-caching of the audio content may provide a smoother, more immediate response to a user input to cause the audio content to be rendered, thereby enhancing the user experience. In one example, the playback device may include one or more sensors configured to detect a presence of a user within a vicinity of the playback device, and the detected presence may be used to trigger a pre-caching of the audio content. As will be discussed in the following, different embodiments for detecting the presence of the user and pre-caching of the audio content may be implemented. Further, different embodiments for determining the audio content to be pre-cached will also be discussed.

Figure 8:
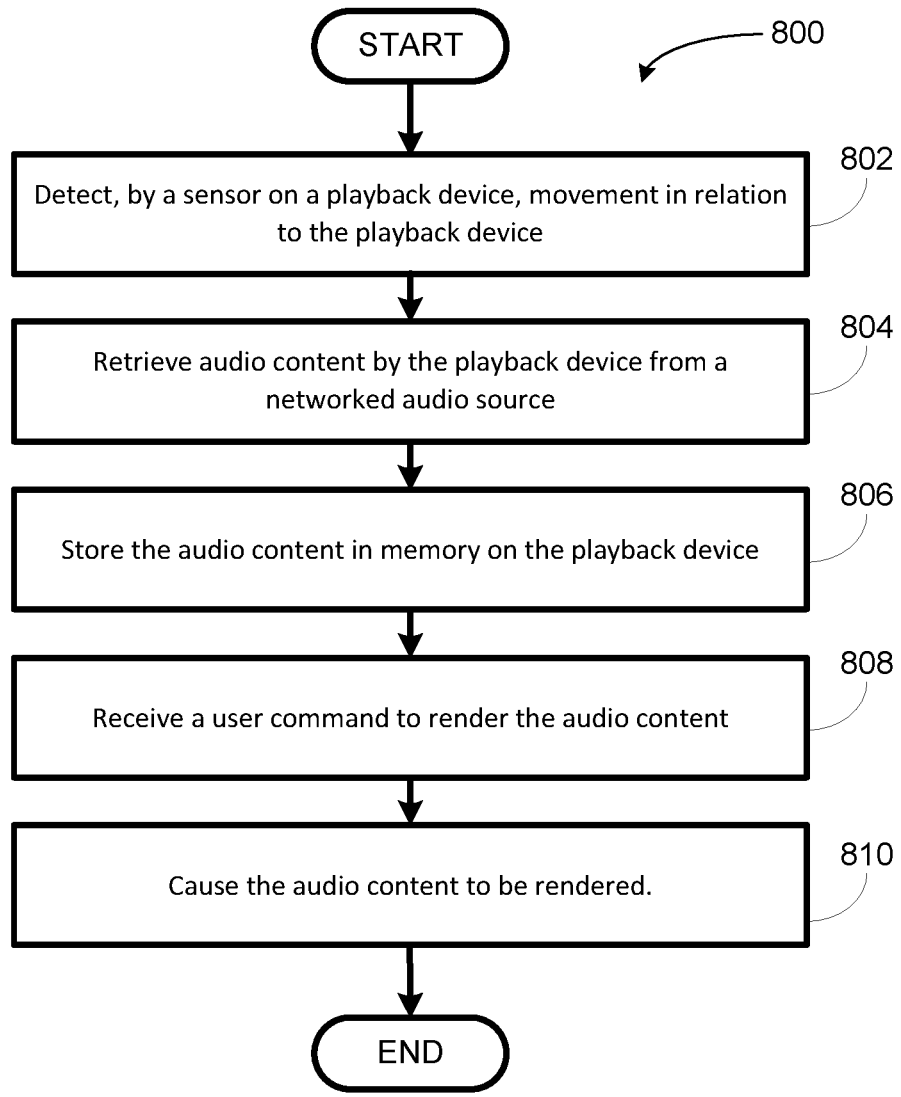
FIG. 8 shows a first example flow diagram for pre-caching audio content based on proximity detection.

FIG. 8 shows a first example flow diagram 800 for pre-caching audio content based on proximity detection, in accordance with at least some embodiments described herein. Method 800 shown in FIG. 8 presents an embodiment of a method that could be used in the environments 100, 600, and 700 with the systems 200, 202, 204, 300, 400, and 500 for example, in communication with one or more devices, such as those illustrated in FIGS. 2-5. Method 800 may include one or more operations, functions, or actions as illustrated by one or more of blocks 802-810. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the method 800 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the method 800 and other processes and methods disclosed herein, each block in FIG. 8 may represent circuitry that is wired to perform the specific logical functions in the process.

At block 802, the method 800 involves detecting, by one or more sensors on a playback device, movement in relation to the playback device. In one example, the one or more sensors may include a proximity sensor configured to detect an approaching movement toward the playback device, such as when a user approaches and/or reaches a hand toward the playback device. In one case, the proximity sensor may be a capacitive sensor. In other cases, the proximity sensor may also be implemented using other sensing technologies, such as infrared (IR) sensing technology and optical sensing technology, for example. In some instances, the one or more sensors may be parts of a sensing module configured to interact and communicate with one or more processors in the playback device. As sensing technologies continue to develop, further sensing technologies that may not currently be available may also be used to implement the proximity sensor.

In some cases, one or more different types of proximity sensors may be implemented on the playback device to detect movements within different ranges of distances from the playback device. For instance, a capacitive proximity sensor may be used for detecting movement close to the playback device, while an IR proximity sensor may be used for detecting movement farther from the playback device. In some cases, more than one proximity sensor may be implemented to provide a robust detection method. For example, a combination of a capacitive sensing device and an infrared sensing devices may be used together.

Figure 9A:
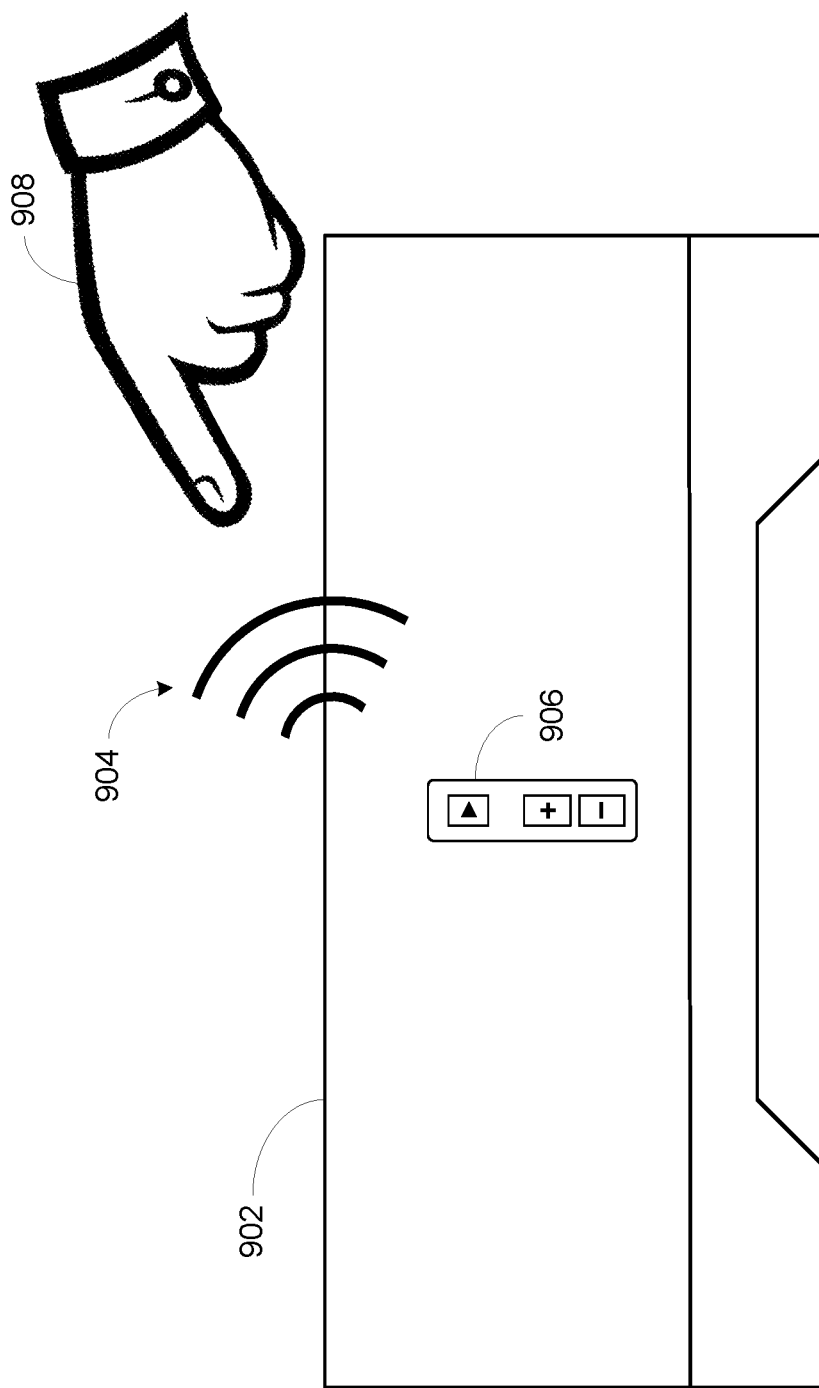
FIG. 9A shows a first example playback device with proximity sensing abilities for pre-caching audio content based on proximity detection.

FIG. 9A shows a first example playback device 902 with proximity sensing abilities 904 for pre-caching audio content based on proximity detection. The playback device 902 may be a system similar to any of the playback systems previously discussed in connection to FIG. 1, FIGS. 2A-C, or FIG. 4. In one example, the playback device 902 may be a stand-alone zone player in a network of zone players. In another example, the playback device 902 may be a part of a bonded zone, such as a consolidated player or a stereo pair, for example. In the case the playback device 902 is a part of a bonded zone, the playback device 902 may be either a primary (or "main") zone player or a secondary (or "satellite") zone player of the bonded zone.

As shown in FIG. 9A, the playback device 902 includes an example control panel 906, with a "play" button, a "volume up" button, and a "volume down" button. Other variations of the control panel 906, with other functional buttons are also possible. Also shown in FIG. 9A is an example user 908 approaching the playback device 902. The approach of the user 908 may be detected by the proximity sensing abilities 904 of the playback device 902. In one example, as indicated previously, the playback device 902 may include one or more sensors implemented and configured to detect movement relative to the playback device 902. For instance, the one or more sensors may be configured to detect an approach of the user 908 toward the playback device 902. In one case, the one or more sensors may be configured to specifically detect movements in relation to a particular part of the playback device 902, such as the control panel 906. In this case, the proximity sensing abilities 904 of the play back device 902 may detect an approach of the user 908 toward the control panel 906.

Figure 9B:
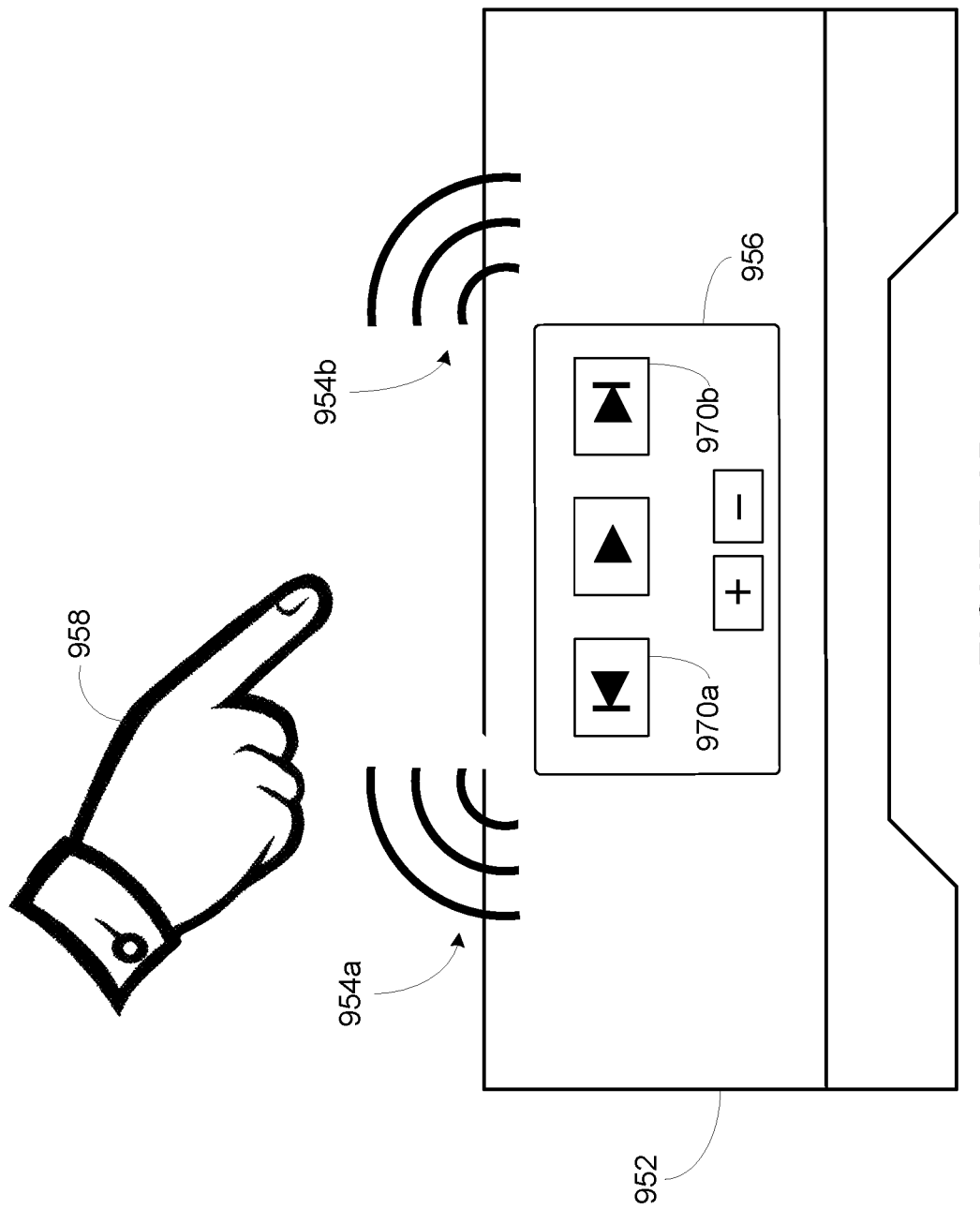
FIG. 9B shows a second example playback device with proximity sensing abilities for pre-caching audio content based on proximity detection.

Further, in another example, the one or more sensors may be implemented and configured to specifically detect movements in relation to more than one particular part of the playback device. FIG. 9B shows a second example playback device 952 with proximity sensing abilities 954*a* and 954*b* for pre-caching audio content based on proximity detection. As shown, the playback device 952 includes a control panel 956 with a "play" button, "volume up" button, "volume down" button, "back" button 970*a*, and "forward" button 970*b*. In this case, sensors of the playback device 952 may be configured such that sensing abilities 954*a* detect movements in relation to a first side of the control panel 956, and sensing abilities 954*b* detect movements in relation to a second side of the control panel 956. As shown, the first side of the control panel 956 may be the side of the control panel 956 that the back button 970*a* is located, and the second side of the control panel 956 may be the side of the control panel 956 that the forward button 970*b* is located.

As suggested previously, the sensors of a playback device, such as playback device 902 or 952 may further be configured to determine movement in relation to the playback device at different distance ranges. In one example, the playback device may include a control interface provided on a touch-sensitive graphical display. The controls available through the control interface may be similar to those shown on the control panels 906 and 956 of the playback devices 902 and 952, respectively. In such an example, the playback device may be configured to only display control options on the graphical display if the playback device, based on proximity detection, determines that a user is within a general vicinity of the playback device, from which the user may view the graphical display and see the control options. In another case, the buttons of the control panel may be back-lit buttons that are configured to only light up if the playback device determines that the user is within the general vicinity of the playback device. In either case, upon displaying the control options on the graphical display or lighting up the control panel buttons, the playback device may then detect movement in relation to the playback device to determine if the user is further approaching, or reaching toward the playback device, specifically the control interface of the playback device, or even more specifically, a particular control option button displayed on the interface.

If the playback device determines, based on detected movements of the user, that the user may be approaching the playback device to enter a playback related command (such as play, forward, or backward, for example), the playback device may begin to pre-cache audio content that the user may wish to cause the playback device to render via an anticipated command input. At block 804, the method 800 involves retrieving audio content by the playback device in response to the detected approach of the user and prior to receiving a command from the user to play the audio content.

In one case, the audio content may be retrieved from a local audio source, such as a local storage memory of the playback device. In another case, the audio content may be retrieved from a networked audio source. The networked audio sources may be a storage memory accessible over a local network, such as a network drive, or a storage memory of another playback device accessible by the playback device over the local network. The networked audio source may also be part of a cloud network, such as the cloud 710 as described above in connection to FIG. 7. In such a case, retrieving the audio content may involve accessing the audio content over the network.

Retrieving audio content by the playback device may also involve determining the audio content to be retrieved. In one example, the audio content to be retrieved may be determined based on a current playback mode of the playback device. As such, retrieving audio content may also involve determining the current playback mode of the playback device, and responsively determining the audio content to retrieve based on the current playback mode of the playback device.

In one case, the playback device may not currently be rendering any audio content. For instance, the playback mode of the playback device may be that of a paused playback in which audio content that was previously being rendered has been paused. Referring back to the control panel 906 of the playback device 902 of FIG. 9A, potential inputs from the user 908 that may affect the playback mode of the playback device may include "play" (or "resume," in the case playback has been paused). In this case, the playback device 902 may determine that the audio content to retrieve for pre-caching may be the audio content that was previously being rendered.

In one example, the audio content that was previously being rendered may be a music track, and retrieval of the audio content may begin at the point in the audio content where the audio content was previously paused. In another example, the audio content that was previously being rendered may be a live radio stream accessed over the network. In this case, retrieval of the audio content for pre-caching may involve re-establishing an access to the live radio stream.

In another instance, the playback device 902 may not be rendering any audio content because a previously rendered audio track ended, or a playlist or playback queue has concluded (and a "repeat" option, if available, for rendering the playlist or playback queue is not active). In one case, the audio content to retrieve for pre-caching may simply be the playlist or playback queue of which rendering had previously concluded. In another case, a favorite playlist, favorite song, or favorite live radio stream may be retrieved for pre-caching. In this case, the favorite playlist, song, or live radio stream may be one that has been rendered the most time by the playback device.

In yet another instance, the playback device may record audio content rendering patterns of the playback device and retrieve audio content according to the recorded patterns. For example, if the user regularly uses the playback device to enjoy classical music accessed through a particular classical music radio stream on Sunday evenings, then on Sunday evenings, the playback device may establish access to the particular classical music radio stream in response to the detected approach of the user. Other implementations of varying complexities and sophistication may also be possible for determining audio content to be retrieved.

In another case, the current playback mode of the playback device may be a rendering of a song in a playlist or a queue. In this case, if the playback device has a control panel similar to the control panel 956 of the playback device 952 shown in FIG. 9B, potential inputs from the user may include inputs to pause or stop the rendering of the song in the playlist, skip forward to the next song in the play list, restart the song currently being rendered, or return to the previous song being rendered. As such, the next song and the previous song may be candidates for pre-caching. In one instance, the previous song and the next song may both be retrieved for pre-caching.

As described above, the playback device 952 may include sensors configured to detect movements in relation to different locations on the control panel 956. As shown in FIG. 9B, the sensing abilities 954a may detect movement in relation to the back button 970a, and the sensing abilities 954b may detect movement in relation to the forward button 970b. Accordingly, the playback device 952 may determine whether a user 958 is reaching toward the back button 970a or the forward button 970b. If the user 958 is determined as reaching toward the back button 970a, the previous song may be retrieved. Analogously, if the user 958 is determined as reaching toward the forward button, the next song may be retrieved. If the sensing abilities 954a and 954b are unable to determine with a level of confidence, which button the user is reaching toward, the previous song and the next song may both be retrieved for pre-caching, as suggested above.

Upon determining the audio content to be retrieved and subsequently retrieving the audio content, the playback device may then pre-cache the retrieved audio content. At block 806, the method 800 involves storing the audio content in memory on the playback device. In one example, the memory on the playback device may include a cache for temporary storage of data such that a future request for the data may be served faster. As such, the audio content in this case may accordingly be "cached" in the memory of the playback device such that the audio content will be readily available if requested, thereby responding to a user command for the playback device to render the audio content faster. In one example, up to 128 kilo-bytes of the memory may be used to cache the audio content. In some cases, 128 kilo-bytes may store three or more seconds of audio content, depending on the sampling characteristics of the audio content.

In the case that the retrieved audio content is a music track, a portion (e.g. the first 128 kilo-bytes, or first three seconds or so) of the audio content may accordingly be pre-cached in anticipation of a user command to cause the music track to be rendered. In one example, the portion of the music track may be stored until a user command is received by the playback device to render either the pre-cached music track or different audio content. If the received user command causes the playback device to render the pre-cached music track, then the music track may be rendered as will be discussed later in connection to blocks 808 and 810. If the user commanded causes the playback device to render different audio content, then the pre-cached music track may be discarded, and the different audio content may be retrieved for rendering.

In another example, the portion of the music track may be stored until any user command is received, whether or not the user command causes any changes in the playback mode of the playback device. For instance, in the case that the playback device is already rendering audio content, the approach of the user towards the playback device may be to adjust a playback volume of the audio content. As such, the pre-cached music track may no longer be applicable to why the user approached the playback device once the user command has been received. In a further example, if no user command is received, the portion of the music track may be stored until the playback device, using the one or more sensors, determines that the user is no longer within a vicinity of the playback device. In other examples, the portion of the music track may be stored indefinitely, or for a predetermined duration of time if no user command is received.

The above discussed example storage durations may also be implemented for other determined and retrieved audio content such as live radio streams, as previously discussed. However, because the content of a live radio stream changes as time goes by, the pre-cached portion of the live radio stream may no longer be current to the live content of the live radio stream if a user command to cause the live radio stream to be rendered is not received shortly after the portion of the live radio stream is stored. As such, in the case the determined audio content is a live radio stream, the playback device may be configured to retrieve new portions of the live radio stream to be stored periodically at a specific time interval. As with the example storage duration discussed above, the periodic pre-caching of the live radio stream may be performed until a user command is received, until the predetermined duration of time has expired, or until the playback device determines that the user is no longer within the vicinity of the playback device.

As discussed thus far, pre-cached audio content includes portions of audio content that the playback device determined as what the user approaching and/or reaching for the playback device may plan to cause the playback device to render. At block 808, the method 800 involves receiving a user command to render the pre-cached audio content, and at block 810, the method 800 involves rendering the audio content. In one case, the user may press a button as anticipated by the playback device, whether it be the play button, back button, or forward button as discussed above. The playback device may then render the pre-cached audio content accordingly, in response to the user command. In this case, because the audio content is pre-cached, rendering of the audio content may begin sooner than if the playback device began retrieval of the audio content after receiving the user command. As such, the pre-caching of the audio content may provide a smoother, more immediate response to a user command to cause the audio content to be rendered, thereby enhancing the user experience.

As discussed previously, the playback device may be part of a bonded zone or zone group. In such a case, the pre-caching of the audio content for smoother playback may be performed by each playback device in the bonded zone or zone group when an approach or presence of a user toward any of the playback devices (or control panels of any of the playback devices) in the bonded zone or zone group is detected, such that rendering of the audio content may occur immediately in a synchronized manner. In another example, the pre-caching of the audio content may be performed by a single playback device and distributed to the playback devices of the bonded zone or zone group when an approach or presence of a user toward any of the playback devices or control panels of any of the playback devices in the bonded zone or zone group is detected.

VIII. Conclusion

The descriptions above disclose various example systems, methods, apparatus, and articles of manufacture including, among other components, firmware and/or software executed on hardware. However, such examples are merely illustrative and should not be considered as limiting. For example, it is contemplated that any or all of these firmware, hardware, and/or software components can be embodied exclusively in hardware, exclusively in software, exclusively in firmware, or in any combination of hardware, software, and/or firmware. Accordingly, while the following describes example systems, methods, apparatus, and/or articles of manufacture, the examples provided are not the only way(s) to implement such systems, methods, apparatus, and/or articles of manufacture.

As indicated above, the present application involves causing a playback device to pre-cache audio content when the playback device determines that a user may be about to cause the playback device to render the audio content. In one aspect, a first method is provided. The first method involves detecting, by a proximity sensor on a playback device, movement in relation to the playback device, responsively retrieving audio content by the playback device from a networked audio source, prior to receiving a user command to play the audio content, and storing the audio content in memory on the playback device. The audio content may be stored in memory in preparation for playback.

In another aspect, a device is provided. The device includes a proximity sensor, a processor, a storage memory, and a computer readable medium having stored thereon instructions executable by the processor to perform function. The functions include detecting, by the proximity sensor, movement in relation to the device, responsively retrieving audio content from a networked audio source prior to receiving a user command to play the audio content, and storing the audio content in the storage memory. The audio content may be stored in memory in preparation for playback.

In a further aspect, a non-transitory computer readable memory is provided. The non-transitory computer readable memory has stored thereon instructions executable by a processor to cause the processor to execute functions. The functions include detecting, by a proximity sensor on a playback device, movement in relation to the playback device, responsively retrieving audio content by the playback device from a networked audio source prior to receiving a user command to play the audio content, and storing the audio content in memory on the playback device. The audio content may be stored in memory in preparation for playback.

Additionally, references herein to "embodiment" means that a particular feature, structure, or characteristic described in connection with the embodiment can be included in at least one example embodiment of the invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible medium such as a memory, DVD, CD, Blu-ray, and so on, storing the software and/or firmware.

The invention claimed is:

1. A first playback device comprising:
a network interface;
an audio stage comprising an amplifier;
at least one processor; and
data storage including instructions that are executable by the at least one processor such that the first playback device is configured to:
receive data indicating user motion;
based on receipt of the data indicating the user motion, predict that the first playback device will receive a subsequent user input to play back audio content;
based on the prediction that the first playback device will receive the subsequent user input to play back audio content, select audio content to pre-cache, wherein the first playback device selects (a) a next media item in a playback queue as the audio content when the first playback device is already playing back the playback queue or (b) a current media item in the playback queue as the audio content when playback on the first playback device is stopped; and
before receipt of the subsequent user input to play back the audio content, pre-cache, via the network interface from a network source, data representing at least a portion of the selected audio content in the data storage.

2. The first playback device of claim 1, wherein the instructions that are executable by the at least one processor such that the first playback device is configured to receive the data indicating user motion comprise instructions that are executable by the at least one processor such that the first playback device is configured to:
receive sensor data indicating motion in proximity to a proximity sensor.

3. The first playback device of claim 2, further comprising a control interface comprising a play/pause control, a skip forward control, and a skip backward control, and wherein the proximity sensor is configured to detect motion in proximity to the control interface.

4. The first playback device of claim 1, wherein the instructions are executable by the at least one processor such that the first playback device is further configured to:
after receipt of the subsequent user input to play back the audio content, play back the selected audio content from the cached data representing at least the portion of the selected audio content.

5. The first playback device of claim 1, wherein the first playback device is configured in a synchrony group with a second playback device, and wherein the instructions are executable by the at least one processor such that the first playback device is further configured to:
after receipt of the subsequent user input to play back the audio content, play back the selected audio content from the cached data representing at least the portion of the selected audio content in synchrony with the second playback device.

6. The first playback device of claim 5, wherein the instructions that are executable by the at least one processor such that the first playback device is configured to receive the data indicating user motion comprise instructions that are executable by the at least one processor such that the first playback device is configured to:
  receive, via the network interface from the second playback device, data indicating that the second playback device detected the user motion in proximity to the second playback device.

7. The first playback device of claim 5, wherein the first playback device is configured as a coordinator of the synchrony group, and wherein the instructions that are executable by the at least one processor such that the first playback device is configured to play back the selected audio content comprise instructions that are executable by the at least one processor such that the first playback device is configured to:
  send, via the network interface to the second playback device, data representing (i) the selected audio content and (ii) timing information to facilitate synchrony playback of the selected audio content with the second playback device.

8. The first playback device of claim 1, wherein the selected audio content comprises an Internet radio station, and wherein the instructions that are executable by the at least one processor such that the first playback device is configured to pre-cache the data representing at least a portion of particular audio content in the data storage comprise instructions that are executable by the at least one processor such that the first playback device is configured to:
  repeatedly pre-cache portions of a stream representing the Internet radio station until the first playback device receives the subsequent user input to play back audio content.

9. A tangible, non-transitory, computer-readable media having stored thereon instructions that are executable by at least one processor of a first playback device such that the first playback device is configured to:
  receive data indicating user motion;
  based on receipt of the data indicating the user motion, predict that the first playback device will receive a subsequent user input to play back audio content;
  based on the prediction that the first playback device will receive the subsequent user input to play back audio content, select audio content to pre-cache, wherein the first playback device selects (a) a next media item in a playback queue as the audio content when the first playback device is already playing back the playback queue or (b) a current media item in the playback queue as the audio content when playback on the first playback device is stopped; and
  before receipt of the subsequent user input to play back the audio content, pre-cache, via a network interface from a network source, data representing at least a portion of the selected audio content in data storage.

10. The tangible, non-transitory, computer-readable media of claim 9, wherein the instructions that are executable by the at least one processor such that the first playback device is configured to receive the data indicating user motion comprise instructions that are executable by the at least one processor such that the first playback device is configured to:
  receive sensor data indicating motion in proximity to a proximity sensor.

11. The tangible, non-transitory, computer-readable media of claim 10, further comprising a control interface comprising a play/pause control, a skip forward control, and a skip backward control, and wherein the proximity sensor is configured to detect motion in proximity to the control interface.

12. The tangible, non-transitory, computer-readable media of claim 9, wherein the instructions are executable by the at least one processor such that the first playback device is further configured to:
  after receipt of the subsequent user input to play back the audio content, play back the selected audio content from the cached data representing at least the portion of the selected audio content.

13. The tangible, non-transitory, computer-readable media of claim 9, wherein the first playback device is configured in a synchrony group with a second playback device, and wherein the instructions are executable by the at least one processor such that the first playback device is further configured to:
  after receipt of the subsequent user input to play back the audio content, play back the selected audio content from the cached data representing at least the portion of the selected audio content in synchrony with the second playback device.

14. The tangible, non-transitory, computer-readable media of claim 13, wherein the instructions that are executable by the at least one processor such that the first playback device is configured to receive the data indicating user motion comprise instructions that are executable by the at least one processor such that the first playback device is configured to:
  receive, via the network interface from the second playback device, data indicating that the second playback device detected the user motion in proximity to the second playback device.

15. The tangible, non-transitory, computer-readable media of claim 13, wherein the first playback device is configured as a coordinator of the synchrony group, and wherein the instructions that are executable by the at least one processor such that the first playback device is configured to play back the selected audio content comprise instructions that are executable by the at least one processor such that the first playback device is configured to:
  send, via the network interface to the second playback device, data representing (i) the selected audio content and (ii) timing information to facilitate synchrony playback of the selected audio content with the second playback device.

16. The tangible, non-transitory, computer-readable media of claim 9, wherein the selected audio content comprises an Internet radio station, and wherein the instructions that are executable by the at least one processor such that the first playback device is configured to pre-cache the data representing at least a portion of particular audio content in the data storage comprise instructions that are executable by the at least one processor such that the first playback device is configured to:
  repeatedly pre-cache portions of a stream representing the Internet radio station until the first playback device receives the subsequent user input to play back audio content.

17. A method to be performed by a first playback device, the method comprising:
  receiving data indicating user motion;
  based on receiving the data indicating the user motion, predicting that the first playback device will receive a subsequent user input to play back audio content; and
  based on the prediction that the first playback device will receive the subsequent user input to play back audio content, selecting audio content to pre-cache, wherein the first playback device selects (a) a next media item in a playback queue as the audio content when the first playback device is already playing back the playback queue or (b) a current media item in the playback queue as the audio content when playback on the first playback device is stopped; and before receipt of the subsequent user input to play back the audio content, pre-caching, via a network interface from a network source, data representing at least a portion of the selected audio content in data storage.

18. The method of claim 17, wherein receiving the data indicating user motion comprises receiving sensor data indicating motion in proximity to a proximity sensor.

19. The method of claim 17, further comprising:

after receipt of the subsequent user input to play back the audio content, playing back the selected audio content from the cached data representing at least the portion of the selected audio content.

20. The method of claim 17, wherein the first playback device is configured in a synchrony group with a second playback device, and wherein the method further comprises:

after receiving the subsequent user input to play back the audio content, playing back the selected audio content from the cached data representing at least the portion of the selected audio content in synchrony with the second playback device.

\* \* \* \* \*